United States Patent [19]

Park

[11] Patent Number: 5,502,717

[45] Date of Patent: Mar. 26, 1996

[54] METHOD AND APPARATUS FOR ESTIMATING ECHO CANCELLATION TIME

[75] Inventor: Sangil Park, Austin, Tex.

[73] Assignee: Motorola Inc., Schaumburg, Ill.

[21] Appl. No.: 283,322

[22] Filed: Aug. 1, 1994

[51] Int. Cl.$^6$ .................................................. H04J 1/00
[52] U.S. Cl. ...................... 370/32.1; 370/32; 370/79; 370/62; 379/202; 379/390; 379/410; 379/411; 395/2.34; 395/2.57
[58] Field of Search ............................ 370/32.1, 32, 79; 379/410, 411, 406, 202, 392, 390, 62; 381/46, 47; 395/2.23, 2.24, 2.34, 2.35, 2.36, 2.42, 2.57, 2.62

[56] References Cited

U.S. PATENT DOCUMENTS

| | | | |
|---|---|---|---|
| 4,628,529 | 12/1986 | Borth et al. | 395/2.35 |
| 4,630,305 | 12/1986 | Borth et al. | 395/2.35 |
| 4,805,215 | 2/1989 | Miller | 379/411 |
| 4,823,382 | 4/1989 | Martinez | 370/32.1 |
| 4,956,838 | 9/1990 | Gilloire et al. | 370/32.1 |
| 5,050,160 | 9/1991 | Fuda | 370/32.1 |
| 5,062,102 | 10/1991 | Taguchi | 370/32.1 |
| 5,195,138 | 3/1993 | Kane et al. | 381/46 |

OTHER PUBLICATIONS

Sangil Park, "Full Duplex Speakerphone with Acoustic and Electric Echo- Canceller utilizing the DSP56200 Cascadable Adaptive Fir Filter Chip", Proc. of Midcon/90 Technical Conference on Electronic and Electrical Technology, Dallas, TX, Sep. 11–13, 1990.

Widrow et al. 'Adaptive Noise Cancelling: Principles and Applications' Proceedings of the IEEE 63, No. 12 Dec 1975 (1692–1716).

Primary Examiner—Douglas W. Olms
Assistant Examiner—Shick Hom

[57] ABSTRACT

Echo time cancellation may be determined in a full duplex system 300 by providing an echo time determiner 302 which samples signals on either the transmit path 105 or the receive path 106. Once sampled, the signals are then filtered via smoothing filter 402 at a first smoothing parameter. Each filtered signal sample 403 is then compared with a first threshold and this comparison is sequentially done until a filtered signal sample is favorable with the first predetermined threshold. When the first signal sample is favorable to the first predetermined threshold, the beginning echo time is determined and the smoothing parameter is adjusted to a second smoothing parameter and the threshold is adjusted to a second predetermined threshold. Upon making these adjustments, the signal samples are again filtered over this time with the second smoothing parameter. The second filtered signals are then compared with the second threshold until a second filtered signal is favorable with the second predetermined threshold. When this occurs, the end of the echo is determined.

13 Claims, 4 Drawing Sheets

METHOD AND APPARATUS FOR ESTIMATING ECHO CANCELLATION TIME

TECHNICAL FIELD OF THE INVENTION

This invention relates generally to teleconferencing systems and, in particular, to echo cancellation within such teleconferencing systems.

BACKGROUND OF THE INVENTION

FIG. 1 illustrates a typical teleconferencing system 100 that includes a microphone 101, and a speaker 102 which are positioned within a room 103. The microphone and speaker 101–102 are connected to a telephone 104 which, in turn, is connected to a public telephone system network via transmitter path 105 and receiver path 106. The transmitter and receiver paths 105–106 are coupled to a telephone line interface 107 which is coupled to another telephone line interface 109, via a two wire line connection 108. As is known within such a topology, when the speaker 102 is generating audible tones, these audible tones 110 are reflected, or bounced, off of the walls, ceiling, and floor of room 103. Due to the speed of sound, these reflected audible tones do not reach the microphone at exactly the same time thus creating a received echo within the microphone 101. This type of echo is commonly referred to as an acoustic echo.

Electrical echoes are also present within the system. Electrical echoes are created when audio signals are being carried on the transmit path 105 to the telephone line interface 107. Due to the imperfections of the telephone line interface 107, an attenuated representation of the audio signals are present on the receiver path 106. As with any signal on the receiver path, if it is not canceled, will be presented to the speaker and rendered audible in the room 103.

A typical echo waveform, whether acoustic or electrical, is shown in FIG. 2. As shown, the speaker begins generation of the audible tones at $t_0$. Due to the speed of sound, the microphone 101 does not receive the audible tones until $t_1$. Upon initial receipt of the audible tones at $t_1$, the bounced, or reflected, signals decay exponentially until time $t_2$. At $t_2$ the echo has decayed to a level that is undetectable by human ears.

To compensate for the echo of FIG. 2, many teleconferencing systems include echo cancellation circuits. One such echo cancellation circuit is described in patent application entitled APPARATUS AND METHOD FOR NOISE REDUCTION FOR A FULL-DUPLEX SPEAKERPHONE OR THE LIKE, having a Ser. No. of 07/975,348, a filing date of Nov. 12, 1992, and is assigned to the same assignee as the present invention. U.S. Pat. No. 5,410,595 utilizes two echo processing blocks. The first echo processing block provides echo cancellation of electrical echoes, while the second echo processing block provides echo cancellation of acoustic echoes. To cancel the electrical echoes, the first echo processing block estimates the amount of signal imposed on the receiver path via the phone line interface and subtracts it from the receiver path. This estimation is done by determining the transfer function of the transmit path 105, the phone line interface 107, and the receiver path 106 and utilizes the transfer function to calculate the electrical echo.

The second echo processing block, which cancels acoustic echoes, estimates the acoustic echo and subtracts it from the transmit path. To achieve this, the second echo processing block determines the transfer function of the microphone 101 the speaker 102 and acoustic parameters of the room 103. Having determined the transfer function, the second echo processing block mathematically determines the acoustic echo.

While this echo cancellation technique works well, it utilizes a fixed echo cancellation time, which, in some applications, is not optimally efficient. The technique is not optimized because, in many situations, the echo is not of a fixed duration. For example, when audible tones produced by the speaker 102 have a substantial amplitude, i.e., loud tones, the echo time may be longer than the fixed duration of the echo cancellation circuit. When this occurs, echo signals will be present on the transmit and receive paths. Conversely, if the fixed duration is set to accommodate for the loud audible tones, the fixed duration will be too long for most echo signals. When this occurs, the echo cancellation continues to perform the echo cancellation mathematical equations after the echo has decayed below an audible level, but because of the computations, the echo cancellation circuit is injecting noise into the system 100.

Therefore, a need exists for method and apparatus that can accurately determine the duration of an echo such that echo cancellation circuits may be optimized.

DETAILED DESCRIPTION OF A PREFERRED EMBODIMENT

Generally, the present invention provides a method and apparatus for determining echo cancellation time. This may be accomplished by providing an echo time determiner that samples signals on either the transmit path or the receive path. Once sampled, the signal samples are filtered via smoothing filter using a first smoothing parameter. Each filtered signal sample is then sequentially compared with a first predetermined threshold until one of the filtered signal samples is favorable with the first predetermined threshold. When this occurs, the beginning echo time is determined, the smoothing parameter is adjusted to a second smoothing parameter, and the threshold is adjusted to a second predetermined threshold. Upon making these adjustments, the remaining signal samples are filtered via the smoothing filter using the second smoothing parameter. These filtered signals are then sequentially compared to the second threshold until one of the second filtered signals is favorable with the second predetermined threshold. When this occurs, the trailing edge of the echo is determined. Having determined the beginning and the end of the echo, the duration of the echo can be utilized by the echo cancellation circuit 301 to provide an accurate duration for echo cancellation. By accurately determining the echo time, unnecessary mathematical computations may be avoided thus reducing total noise of the overall system.

Figure 3:
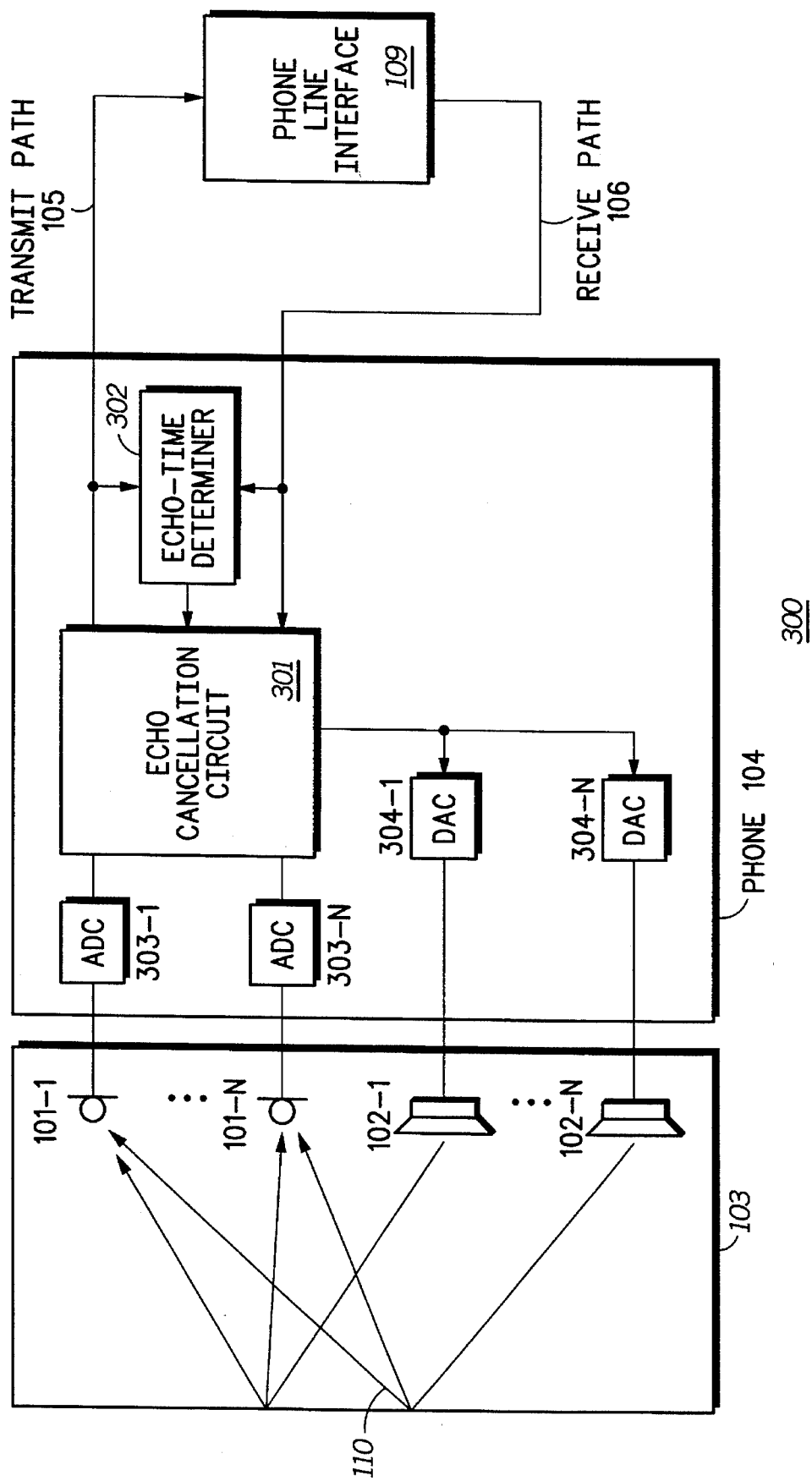
FIG. 3 illustrates a full duplex system in accordance with the present invention.

The present invention can be more fully described with reference to FIGS. 3–5. FIG. 3 illustrates a full duplex system 300 which includes a plurality of microphones 101-1 to 101 -N and a plurality of speakers 102-1 to 101-N positioned throughout an acoustic room 103. The number of speakers 102 and microphones 101 and their positioning will be dependent upon the size of the room 103. For example, if the room is relatively small, say 3 meters by 3 meters, only one microphone and one speaker may be used. If, however, the room 103 is a large conference room, such as a teleconferencing room that includes audio and/or visual communication equipment, multiple microphones and speakers are needed to provide adequate audio reception and detection.

Within the acoustic room 103, the audible sounds 110 generated by the speakers 102 are reflected off of the walls, ceiling, and floors and subsequently received by microphones 101. (Cancellation of these reflected signals, or echoes, will be discussed below.) Also shown in FIG. 3, is a telephone 104 which includes a plurality of analog-to-digital converters 303-1 to 303-N, a plurality of digital-to-analog converts 304-1 to 304-N, an echo cancellation circuit 301 and an echo timed determiner 302. Each of the analog-to-digital converters 303 are connected to a respective microphone 101, while each of the digital-to-analog converts 304 are connected to a respective speaker 102. The echo cancellation circuit 301, which may be an echo cancellation circuit as described in the above mentioned U.S. Pat. No. 5,410,595, receives electrical echoes and acoustic echoes via the receive path 106 and the transmit path 105, respectively. The echo cancellation circuit 301 also receives input from the echo time determiner 302, which is coupled to the receive path 106 and the transmit path 107.

The echo time determiner 302 samples the transmit path 105 for acoustic echoes and/or the receiving path 106 for electrical echoes. Recall that acoustic echoes are produced by audio signals, which were rendered audible by the speakers, bouncing or reflecting off the walls, ceiling, and floor of the acoustic room 103 and being received by microphones 101. Electrical echoes are generated as a result of the transmit path, the phone line interface 109 and the receive path transfer function. Based on the transfer function, signals present on the transmit path 105 are leaked via the phone line interface 109 on the receive path 106. Based on which type echo is being sensed, the echo time determiner 302 provides an exact echo duration to the echo cancellation circuit 301 such that the echo cancellation circuit 301 may effectively cancel the echo. By having an exact echo duration, unnecessary processing steps and calculations are avoided. Thus, processing time and energy are saved as well as reducing overall noise.

Figure 4:
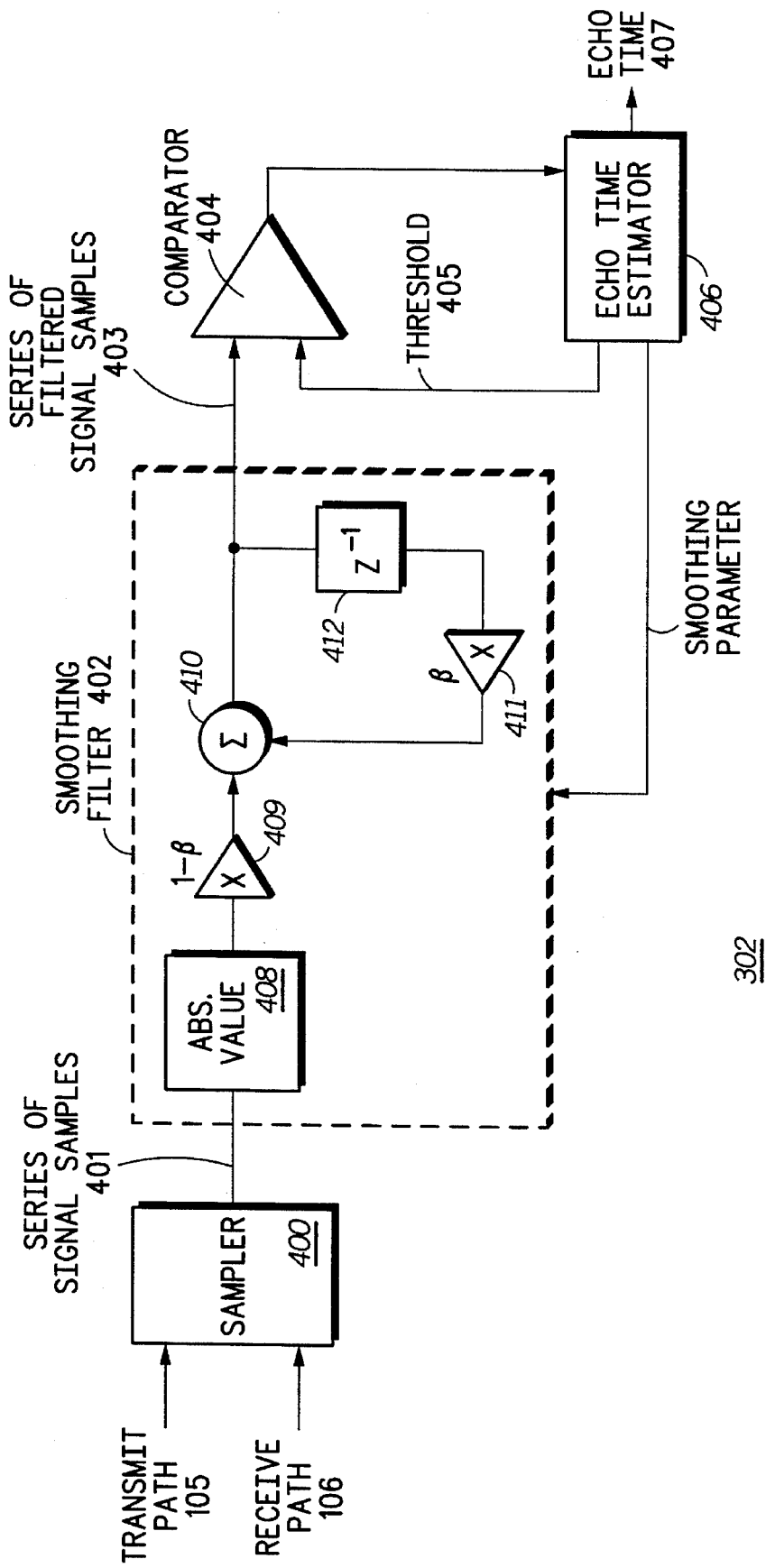
FIG. 4 illustrates a detailed block diagram of the echo time determiner in accordance with the present invention.

FIG. 4 illustrates a detailed schematic block diagram of the echo time determiner 302. As shown, a sampler 400 receives signals via the transmit path 105 and/or the receive path 106. While the echo time determined 302 is shown having both the transmit path and receive path 106 providing inputs, the determiner 302 may only receive one of the signals. For example, the determiner 302 may be used for electrical cancellations, thus it would only be coupled to the receive path 106. Conversely, if the determiner 302 is used for acoustic echoes only, the sampler 400 would receive inputs from the transmit path 105.

Regardless of which type of echo is being canceled, the sampler 400 produces a series of signal samples 401 by sampling signals on the respective path 105–106. The series of signal samples 401 are provided to a smoothing filter 402 which produces a series of filtered signal samples 403. The series of filtered samples 403 are then sequentially compared, via a comparator 404, with a predetermined threshold 405, wherein, the predetermined threshold is initially set at a first level 405. The sequential comparison of the filtered samples 403 to the first predetermined threshold is as the term implies. Each time consecutive filtered sample is compared with the first threshold 405, if this comparison is not favorable, the next time sequenced filtered sample is compared. This single sample comparison continues until one of the filtered samples is favorable to the first threshold. In the preferred embodiment, when one of the filtered samples is favorable to the first predetermined threshold refers to the condition when the filter sample is greater than the predetermined threshold. However, one skilled in the art will appreciate that a favorable relationship may be obtained in a variety of ways. For example, the polarity of the comparator could be switched, the signals could be inverted, scaled, etc.

When a filtered signal sample exceed the first predetermined threshold, an echo time estimator 406 generates a first arrival time of an echo 407. In other words, the echo time estimator 406 time stamps the first detection of the echo. Upon time stamping the echo, the echo time estimator 406 generates a smoothing parameter adjustment signal and a predetermined threshold adjustment signal. The smoothing parameter adjustment signal causes the smoothing filter 402 to adjust its smoothing parameter to a second smoothing parameter. The threshold adjustment signal causes the threshold 405 to be switched to a second predetermined threshold.

Having made the above mentioned adjustments, the echo time determiner 302 continues to sample the echo, filter the samples, and compare the remaining filter samples using the second smoothing parameter and the second predetermined threshold 405. When one of the filtered signal sample 403 is favorably compared to the second predetermined threshold, the echo time estimator 406 indicates end time of echo 407. The echo time estimator 406 indicates the end of echo by time stamping when the second filtered sample is favorable to the second predetermined threshold. By having the beginning time of the echo and the ending time of the echo, the duration is readily calculable and provided to the echo cancellation circuit 301. In the preferred embodiment, when the second filtered sample is favorable to the second predetermined threshold refers to the condition when the second filtered signal sample is less than the second predetermined threshold. As will be appreciated by one skilled in the art, a favorable condition may be arrived at in a variety of ways, which have been mentioned above.

As described, the smoothing filter 402 filters the signal samples using either the first smoothing parameter or the second smoothing parameter. To achieve this, the smoothing filter includes an absolute value determiner 408, a first multiplier 409, a summer 410, a time delay 412, and a second multiplier 411. The first multiplier 409 is shown to have a multiplication factor, of 1-$\beta$ while the second multiplier 411 is shown to have a multiplication factor of $\beta$. In practice, the first smoothing parameter is approximately B equal to 0.9, while the second smoothing parameter is approximately B equal to 0.99. Utilizing these smoothing parameters, the invention accurately determines the duration of the echo.

As shown, the echo time determiner 302 comprises a plurality of discrete elements. While the echo time determiner 302 may be implemented using discrete hardware components, it may also be implemented in a digital signal processor (DSP), Due to the essentially mathematical operation of the echo time determiner 302, the preferred embodiment is to implement the echo time determiner 302 and the echo cancellation circuit 301 in a DSP.

Thus far, the discussion has primarily focused on determining an echo duration for a single microphone. But, as shown in FIG. 3, the system 300 is shown having a plurality of microphones 101 and a plurality of speakers 102. Thus, for each microphone in the system, an echo duration must be calculated. To do this, one of the microphones and all of the speakers are enabled while the remaining microphones are disabled. With this configuration, an audible test impulse, or other audible signal, is supplied to the plurality of speakers which render the signal audible. The one enabled microphone receives the audible signal and the above described echo duration process is evoked. Having performed this for one microphone, this microphone is disabled and another is enabled until each microphone has been tested.

Figure 5:
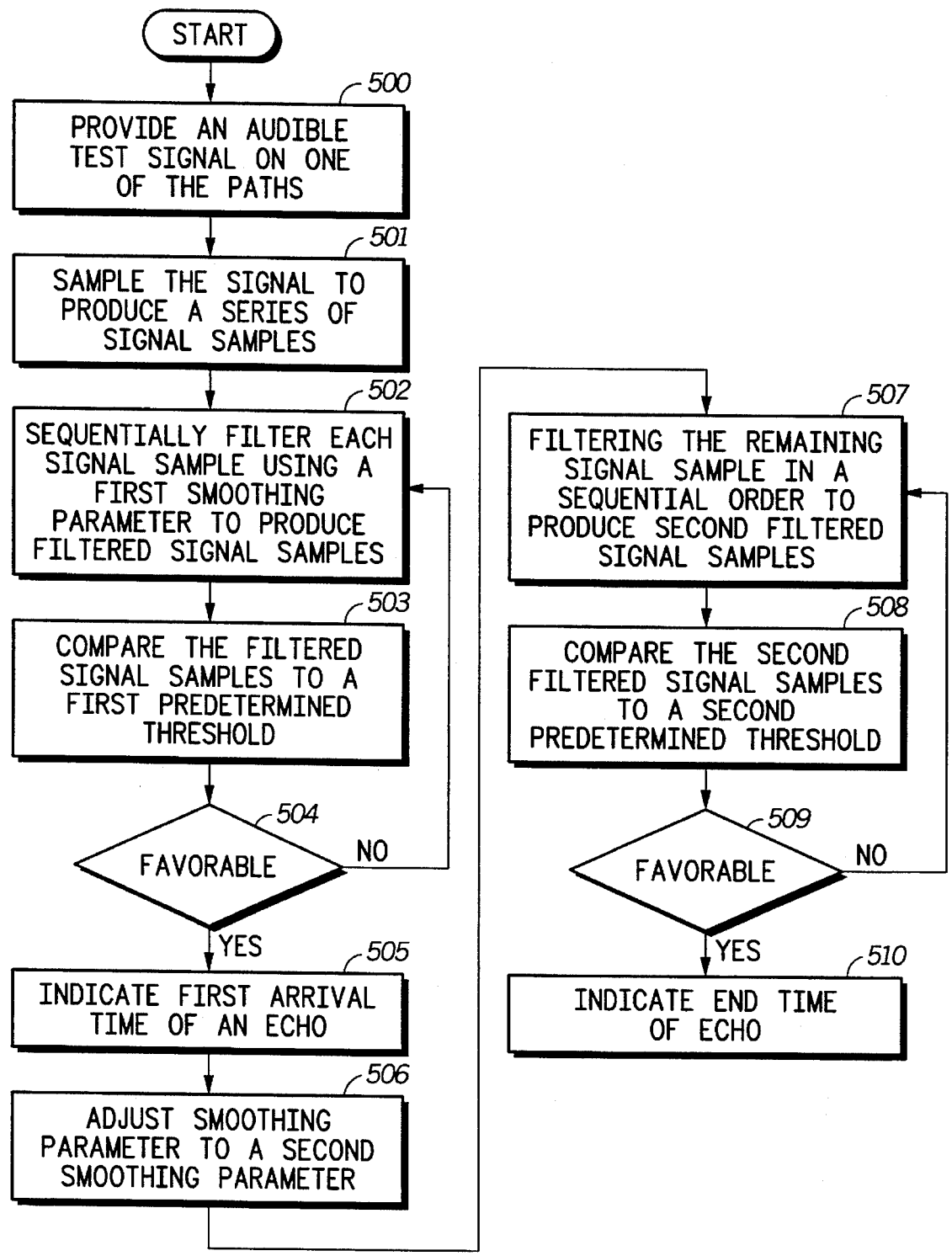
FIG. 5 illustrates a logic diagram that may be used to implement the present invention.

FIG. 5 illustrates a logic diagram that may be used to implement the present invention. At step 500, an audible test signal is provided on one of the transmit or receive paths. This audible test signal may be digitally generated to be a short duration tone such that echo durations can be determined. Conversely, the audible test signal may be voice patterns stored within the telephone, or voice patterns that are active during a full duplex, or teleconferencing, phone call. Having provided a signal, the signal's echo is sampled to produce a series of signal samples 501. The series of signal samples are sequentially filtered using a first smoothing parameter to produce filtered signal samples 502. The filtered signal samples are then compared to a first predetermined threshold in a sequential order 503. If the comparison is unfavorable 504, the process continues at 502.

Figure 1:
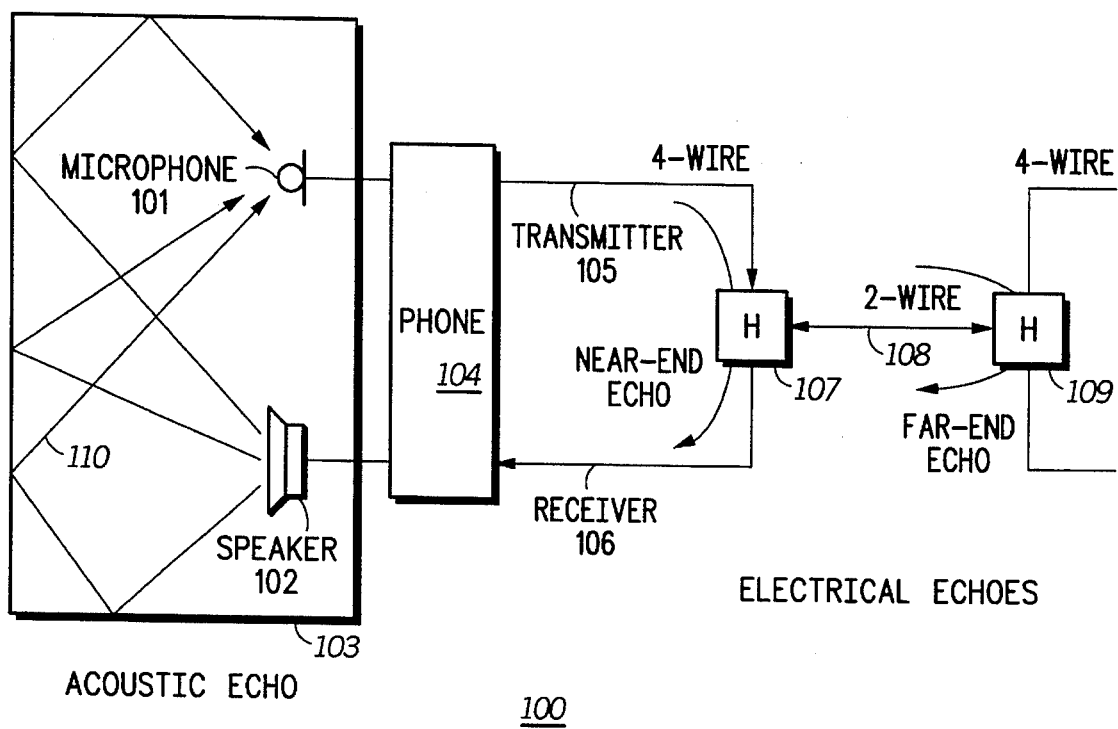
FIG. 1 illustrates a typical prior art teleconferencing system.
Figure 2:
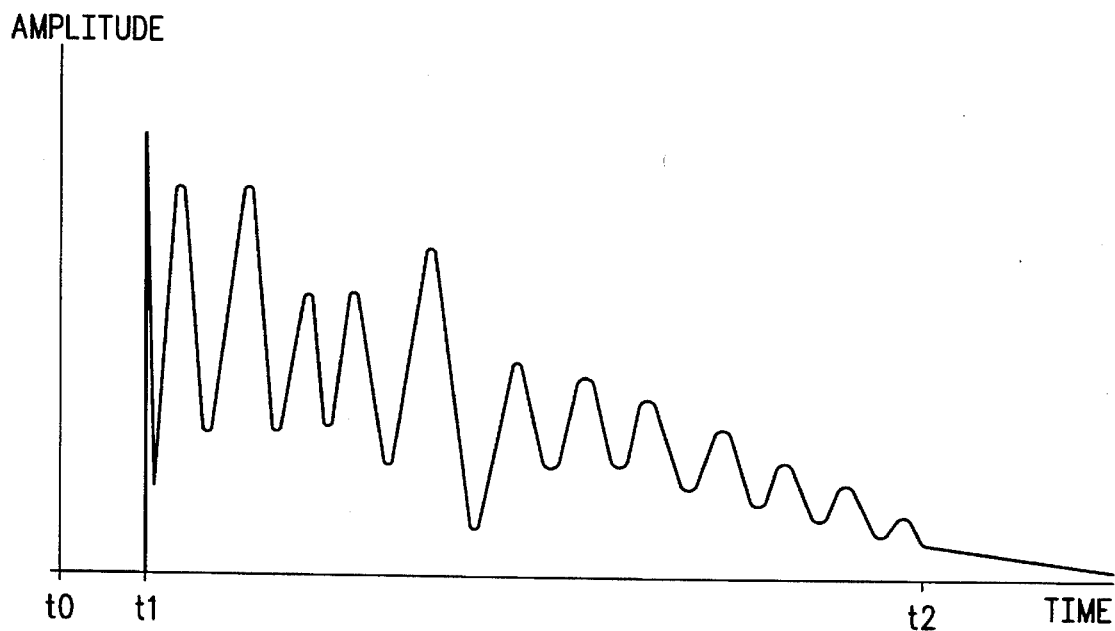
FIG. 2 illustrates a typical echo wave form.

The filtered signal samples are sequentially compared to the first predetermined threshold until one of the filtered signal samples is favorable to the first predetermined threshold 504. When this occurs, an indication of first arrival time of an echo is set 505. Having set the first arrival of an echo, the smoothing parameter is adjusted to a second smoothing parameter 506 and the predetermined threshold is adjusted to a second predetermined threshold. Having made these adjustments, the remaining signal samples of the echo are filtered utilizing the second smoothing parameter 505. Each of the second filtered signal samples are then compared with the second predetermined threshold 508, until a favorable indication is received 509. If a favorable indication is not received, the process repeats at 507. Once a favorable comparison is made 509, an end time of echo is indicated 510. By providing a first arrival time of an echo and end time of an echo, the duration of the echo can be accurately determined. Note that, in practice, the first arrival time of an echo will be $t_1$ and the end time of an echo will be $t_2$ as shown in FIG. 2. Having determined the echo duration, the process repeats at step 500 for the next calculation.

The present invention provides a method and apparatus for determining echo time duration. By having an accurate echo time, an echo cancellation circuit may be adjusted to perform the mathematical operations to cancel the exact echo. By having the exact time, unnecessary mathematical and processing steps are eliminated thus saving processing power and reducing the total noise which results from performing unnecessary mathematical operations. Further, by having a variable echo time cancellation, large echoes may be completely canceled whereas in prior art systems of fixed echo durations this was not the case.

I claim:

1. In a full duplex system, a method for estimating echo cancellation time, the method comprises the steps of:

a sampling a signal on at least a transmitting path or a receiving path in the full duplex system to produce a series of signal samples;

b filtering, in a sequential order, signal samples of the series of signal samples to produce filtered signal samples, wherein the filtering is done using a first smoothing parameter;

c comparing, in the sequential order, the filtered signal samples with a first predetermined threshold until a first filtered signal sample of the filtered signal samples is a first predetermined relationship to the first predetermined threshold;

d when the first filtered signal sample is the first predetermined relationship to the first predetermined threshold, indicating an arrival time of an echo;

e when the first filtered signal sample is the first predetermined relationship to the first predetermined threshold, adjusting the smoothing filter to have a second smoothing parameter, wherein the second smoothing parameter is greater than the first smoothing parameter;

f filtering, in the sequential order, remaining signal samples of the series of signal samples to produce a series of second filtered signal samples, wherein the filtering is done using the second smoothing parameter;

g comparing each of the second filtered signal samples with a second predetermined threshold until a second filtered signal sample is a second predetermined relationship to the second predetermined threshold, wherein the first predetermined threshold is greater than the second predetermined threshold; and h when the second filtered signal sample is the second predetermined relationship to the second predetermined threshold, indicating an end time of the echo.

2. The method of claim 1, wherein step c further comprises defining the first predetermined relationship as the first filtered signal sample being greater than the first predetermined threshold.

3. The method of claim 1, wherein step g further comprises defining the second predetermined relationship as the second filtered signal sample being less than the second predetermined threshold.

4. The method of claim 1, wherein step a further comprises sampling, as the signal, an audible test impulse.

5. The method of claim 4 further comprises generating the audible test impulse prior to sampling the signal.

6. In a full duplex telephone system having multiple audio inputs, a method for estimating echo cancellation time, the method comprises the steps of:

a sourcing a signal on a first audio input of the multiple audio inputs;

b sampling the signal on a receiving path in the full duplex telephone system to produce a series of signal samples;

c sequentially inputting signal samples of the series of signal samples into a smoothing filter having a first smoothing parameter to produce a series of filtered signal samples;

d sequentially comparing each filtered signal sample of the series of filtered signal samples with a predetermined threshold until one of the series of filtered signal samples is a first predetermined relationship to the predetermined threshold;

e when the one of the series of filtered signal samples is the first predetermined relationship to the predetermined threshold, indicating an arrival time of an echo;

f when the one of the series first filtered signal samples is the first predetermined relationship to the predetermined threshold, adjusting the smoothing filter to have a second smoothing parameter, wherein the second smoothing parameter is greater than the first smoothing parameter;

g continuing the sequential inputting of remaining signal samples of the series of signal samples into the smoothing filter having the second smoothing parameter to produce a series of second filtered signal samples;

h sequentially comparing second filtered signal samples of the series of signal samples with a second predetermined threshold until a one of the second filtered signal samples is a second predetermined relationship to second predetermined threshold, wherein the first predetermined threshold is greater than the second predetermined threshold;

i when the one of the series of second filtered signal samples is the second predetermined relationship to the second predetermined threshold, indicating an end time of the echo; and j repeating steps a through i for each of remaining audio inputs of the multiple audio inputs.

7. The method of claim 6, wherein step d further comprises defining the first predetermined relationship as the first filtered signal sample being greater than the first predetermined threshold.

8. The method of claim 6, wherein step h further comprises defining the second predetermined relationship as the second filtered signal sample being less than the second predetermined threshold.

9. The method of claim 6, wherein step a further comprises sourcing, as the signal, an audible test impulse.

10. A full duplex system having echo cancellation comprising:

a transmit path;

a receive path;

a sampler that samples a signal on at least the transmit path or the receive path to produce a series of signal samples;

a smoothing filter having an adjustable smoothing parameter, wherein the smoothing filter sequentially filters, at a first smoothing parameter, each signal sample of the series of signal samples to produce a first series of filtered signal samples and, upon a smoothing adjustment input, sequentially filters, at a second smoothing parameter, each remaining signal sample of the series of signal samples to produce a second series of filtered signal samples;

a comparator that compares each filtered signal sample of the first series of filtered signal samples with a first predetermined threshold until a first filtered signal sample is a first predetermined relationship to the first predetermined threshold and compares each filtered signal sample of the second series of filtered signal samples with a second predetermined threshold until a second filtered signal sample is a second predetermined relationship to the second predetermined threshold; and an echo time estimator that estimates an arrival time of an echo when the first filtered signal sample is the first predetermined relationship to the first predetermined threshold and an end of echo time for the echo when the second filtered signal sample is favorable to the second predetermined threshold, wherein the echo time estimator provides the smoothing adjustment input to the smoothing filter when the first filtered signal sample is favorable to the first predetermined threshold.

11. The full duplex system of claim 10 further comprises:

a digital signal processor that implements the sampler, smoothing filter, the comparator, and the echo time estimator.

12. An echo time determination apparatus comprising:

a sampler that samples a signal to produce a series of signal samples;

a smoothing filter having an adjustable smoothing parameter, wherein the smoothing filter sequentially filters, at a first smoothing parameter, each signal sample of the series of signal samples to produce a first series of filtered signal samples and, upon a smoothing adjustment input, sequentially filters, at a second smoothing parameter, each remaining signal sample of the series of signal samples to produce a second series of filtered signal samples;

a comparator that compares each filtered signal sample of the first series of filtered signal samples with a first predetermined threshold until one of the first series of filtered signal samples is a first predetermined relationship to the predetermined-threshold and compares each filtered signal sample of the second series of filtered signal samples with a second predetermined threshold until one of the second series of filtered signal samples is a second predetermined relationship to the second predetermined threshold; and an echo time estimator that estimates an arrival time of an echo when the first filtered signal sample is the first predetermined relationship to the first predetermined threshold and an end time of the echo when the second filtered signal sample is favorable to the second predetermined threshold, wherein the echo time estimator provides the smoothing adjustment input to the smoothing filter when the first filtered signal sample is favorable to the first predetermined threshold.

13. The echo time determination apparatus of claim 12, wherein the echo time estimator provides the second predetermined threshold to the comparator when the one of the first series of filtered signal samples is the first predetermined relationship to the first predetermined threshold.

* * * * *